(12) United States Patent
Bae

(10) Patent No.: US 10,264,163 B2
(45) Date of Patent: Apr. 16, 2019

(54) DISPLAY APPARATUS AND CONTROL METHOD THEREOF

(71) Applicant: SAMSUNG ELECTRONICS CO., LTD., Suwon-si, Gyeonggi-do (KR)

(72) Inventor: Gun-young Bae, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/401,418

(22) Filed: Jan. 9, 2017

(65) Prior Publication Data

US 2017/0237881 A1    Aug. 17, 2017

(30) Foreign Application Priority Data

Feb. 15, 2016    (KR) .................. 10-2016-0017179

(51) Int. Cl.

| H04N 7/173 | (2011.01) |
|---|---|
| H04N 5/04 | (2006.01) |
| H04N 5/44 | (2011.01) |
| H04N 5/50 | (2006.01) |
| H04N 21/426 | (2011.01) |
| H04N 21/438 | (2011.01) |

(52) U.S. Cl.
CPC .................. *H04N 5/04* (2013.01); *H04N 5/44* (2013.01); *H04N 5/50* (2013.01); *H04N 21/4263* (2013.01); *H04N 21/4381* (2013.01)

(58) Field of Classification Search
CPC combination set(s) only.
See application file for complete search history.

(56) References Cited

U.S. PATENT DOCUMENTS

| 9,113,201 B2 | 8/2015 | Bae |
|---|---|---|
| 2008/0172710 A1 | 7/2008 | Kang et al. |
| 2012/0176551 A1* | 7/2012 | Matsuura ........... H04N 21/4331 348/726 |

(Continued)

FOREIGN PATENT DOCUMENTS

| EP | 2 566 176 | 3/2013 |
|---|---|---|
| JP | 2011-135567 | 7/2011 |
| KR | 10-2006-0088646 | 8/2006 |

(Continued)

*Primary Examiner* — Mulugeta Mengesha
(74) *Attorney, Agent, or Firm* — Sughrue Mion, PLLC

(57) ABSTRACT

A display apparatus is provided. The display apparatus includes a tuner configured to receive a broadcast signal including a plurality of frames by tuning a channel, a display configured to display the received broadcast signal, an interface comprising interface circuitry configured to receive a channel change command, communication circuitry configured to receive timing information of the reference frame of the broadcast signal provided through a channel tuned according to the channel change command from an external apparatus, and a processor configured to, in response to the channel change command being received, predict timing for receiving the reference frame through the tuner based on the timing information of the reference frame received through the communication circuitry, to determine timing for performing channel tuning according to the channel change command based on the predicted timing, and to delay the channel tuning until the determined timing.

18 Claims, 6 Drawing Sheets

(56) References Cited

U.S. PATENT DOCUMENTS

2013/0051464 A1\* 2/2013 Bae .................... H04N 21/4384
375/240.12
2014/0132843 A1\* 5/2014 Zentner ................ H04N 21/231
348/731

FOREIGN PATENT DOCUMENTS

| KR | 10-2008-0066483 | 7/2008 |
| KR | 10-2013-0024571 | 3/2013 |

\* cited by examiner

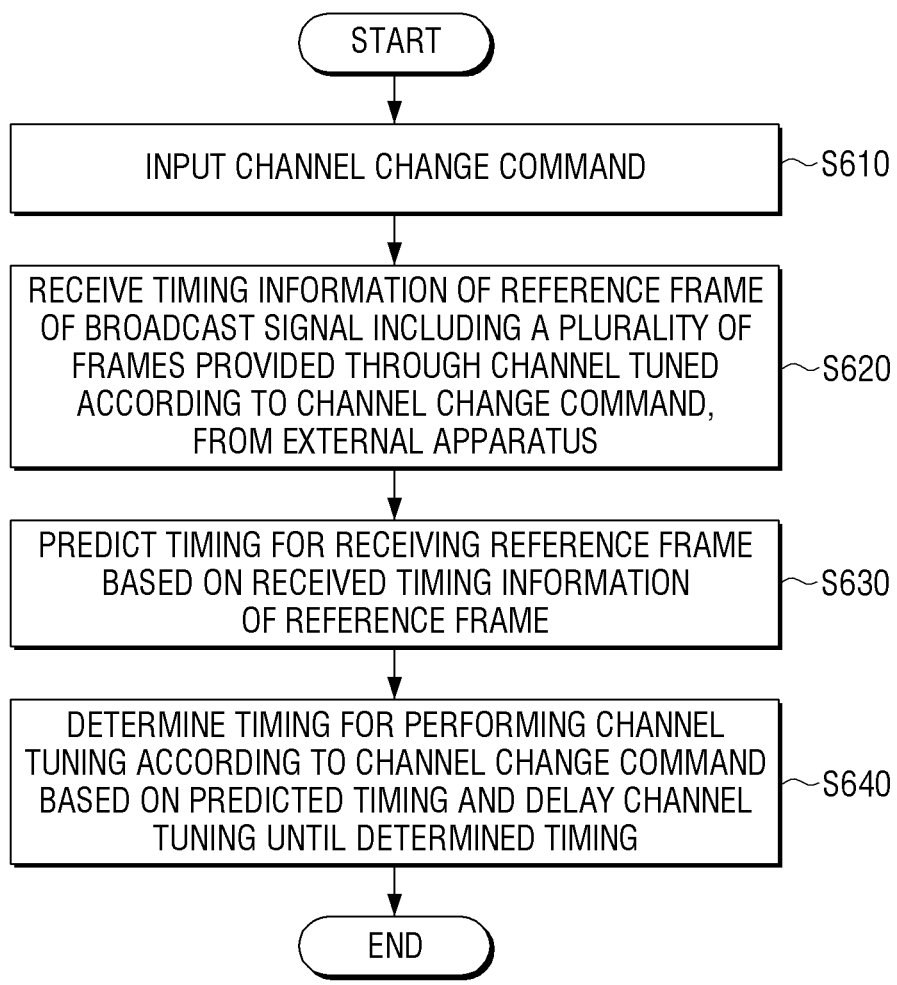

DISPLAY APPARATUS AND CONTROL METHOD THEREOF

CROSS-REFERENCE TO RELATED APPLICATION

This application is based on and claims priority under 35 U.S.C. § 119 to Korean Patent Application No. 10-2016-0017179, filed on Feb. 15, 2016, in the Korean Intellectual Property Office, the disclosure of which is incorporated by reference herein in its entirety.

BACKGROUND

Field

The present disclosure relates generally to a display apparatus and a control method thereof, and for example, to a display apparatus that enables a quick channel change and a control method thereof.

Description of Related Art

In general, a digital display apparatus, such as a digital television (TV) or an Internet Protocol Television (IPTV), may provide a high-definition and high-quality moving image in comparison with an analog method. However, the digital display apparatus receives and displays a moving image that is compressed according to a digital image compression technique such as Moving Picture Experts Group (MPEG) 2 and thus takes a larger amount of time to change a channel into a requested channel according to a channel change command of a user in comparison with an analog display apparatus.

In detail, the moving image that is compressed according to the digital image compression technique includes a plurality of Group Of Pictures (GOPs) each including an Intra (I) picture, a Predictive (P) picture, and a Bidirectionally predictive (B) picture. Also, the digital display apparatus performs buffering with respect to each of the GOPs. If the channel change command is input from the user, the digital display apparatus enters into a standby state where a time for channel tuning, an I picture seek time for seeking an I picture of a channel corresponding to the input channel change command, a buffering time, and a time for DP delay are taken until a changed channel is displayed. This standby state is referred to as a mute state.

Here, since the user has no choice but to view a black screen during the mute state where the channel change is performed, a channel change time felt by the user is long. Therefore, there is a need for a solution to reduce channel change time felt by the user according to a channel change command, e.g., time when the mute state exists.

SUMMARY

Example embodiments of the present disclosure address the above disadvantages and other disadvantages not described above.

The present disclosure provides a display apparatus capable of reducing channel change time felt by a user by reducing time when a mute state exists, and a control method thereof.

According to an example aspect of the present disclosure, a display apparatus includes a tuner configured to receive a broadcast signal including a plurality of frames by tuning a channel, a display configured to display the received broadcast signal, an interface comprising circuitry configured to receive a channel change command, a communicator comprising communication circuitry configured to receive timing information of a reference frame of the broadcast signal provided through the channel to which the display apparatus is tuned based on the channel change command from an external apparatus, and a processor configured to, in response to the channel change command being received, predict timing for receiving the reference frame through the tuner based on the timing information of the reference frame received through the communication circuitry, to determine timing for performing channel tuning according to the channel change command based on the predicted timing, and to delay the channel tuning until the determined timing.

The broadcast signal may be a standard signal of a digital image compression technique that is divided into a plurality of Group Of Pictures (GOPs) each including an Intra (I) picture, a Predictive (P) picture, and a Bidirectionally predictive (B) picture. The communicator may receive timing information of an I picture included in at least one GOP sequentially received based on a first GOP including a frame received in a point of time when the channel change command is input, from the external apparatus.

The display apparatus may further include a storage configured to store information about time taken for the channel tuning. The processor may determine timing, where a time for predicting timing of receiving of the reference frame corresponds to time taken for the stored channel tuning, as the timing for performing the channel tuning.

The timing information of the reference frame may include information about an order of a frame and a size of a GOP that are currently received by the external apparatus that receives a channel equal to a channel to be tuned according to the channel change command.

The information about the size of the GOP may be information that is statistically determined from a broadcast signal provided from the channel equal to the channel to be tuned according to the channel change command.

The timing information of the reference frame may include time information about a point of time when receiving of the reference frame is predicted.

The processor may be configured cause the display apparatus to continuously display a broadcast signal provided from a tuned channel when the channel change command is input, while the channel tuning to the changed channel is delayed.

The external apparatus may be another display apparatus, and the processor, in response to the channel change command being input, may seek another display apparatus tuned into the same channel as the channel to be tuned according to the channel change command on a same network and receive the timing information of the reference frame from the sought other display apparatus.

The processor may seek other display apparatuses on a same network, periodically receive information about a channel tuned into other display apparatuses from the sought other display apparatuses, and, in response to the channel change command being input, receive the timing information of the reference frame from other display apparatuses tuned into the same channel as the channel to be tuned according to the channel change command.

The external apparatus may be a server configured to provide timing information of a reference frame of a broadcast signal respectively provided from a plurality of channels.

According to another example aspect of the present disclosure, a method of controlling a display apparatus, includes receiving a channel change command, receiving timing information of a reference frame of a broadcast signal including a plurality of frames provided through a channel tuned according to the channel change command, from an external apparatus, predicting timing for receiving the reference frame based on the received timing information of the reference frame, and determining timing for performing channel tuning according to the channel change command based on the predicted timing, and delaying the channel tuning until the determined timing.

The broadcast signal may be a standard signal of a digital image compression technique that is divided into a plurality of GOPs each including an I picture, a P picture, and a B picture. The receiving of the timing information may include receiving timing information of an I picture included in at least one GOP sequentially received based on a first GOP including a frame received in a point of time when the channel change command is input, from the external apparatus.

The delaying of the channel tuning may include determining timing, where time for predicting timing of receiving of the reference frame corresponds to time taken for the pre-stored channel tuning, as timing for performing the channel tuning, based on information about time taken for the pre-stored channel tuning.

The timing information of the reference frame may include information about an order of a frame and a size of a GOP that are currently received from an external apparatus that receives a channel equal to a channel to be tuned according to the channel change command.

The information about the size of the GOP may be information that is statistically determined from the broadcast signal provided from the channel equal to the channel to be tuned according to the channel change command.

The timing information of the reference frame may include time information about a point of time when the receiving of the reference frame is predicted.

The delaying of the channel tuning may include continuously displaying a broadcast signal provided from a tuned channel when the channel change command is input, while the channel tuning to the changed channel is delayed.

The external apparatus may be another display apparatus. The receiving of the timing information of the reference frame may include, in response to the channel change command being input, seeking another display apparatus tuned into a same channel as a channel to be tuned according the channel change command on a network and receiving the timing information of the reference frame from the sought other display apparatus.

According to various example embodiments of the present disclosure, channel change time felt by a user may be reduced by removing a time for seeking a reference frame, thereby improving convenience of the user.

Additional and/or other aspects and advantages of the disclosure will be set forth in part in the description which follows and, in part, will be apparent from the description.

BRIEF DESCRIPTION OF THE DRAWINGS

The above and/or other aspects, features and attendant advantages of the present disclosure will be more readily apparent and understood from the following detailed description, taken in conjunction with the accompanying drawings, in which like reference numerals refer to like elements, and wherein:

FIG. 6 is a flowchart illustrating an example method of controlling a display apparatus according to an example embodiment of the present disclosure.

DETAILED DESCRIPTION

Figure 1:
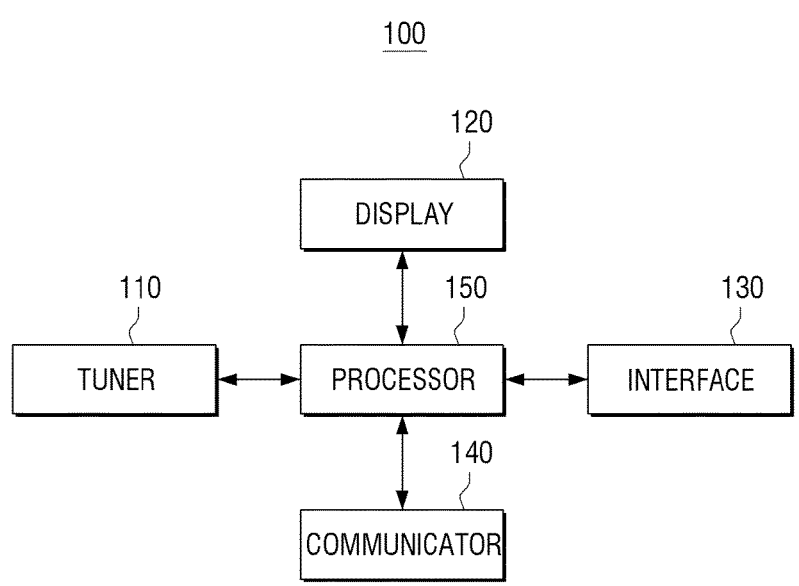
FIG. 1 is a block diagram illustrating an example configuration of a display apparatus according to an example embodiment of the present disclosure.

Various example embodiments of the present disclosure will now be described in greater detail with reference to the accompanying drawings.

In the following description, same drawing reference numerals are used for the same elements even in different drawings. The matters defined in the description, such as detailed construction and elements, are provided to assist in a comprehensive understanding of the disclosure. Thus, it is apparent that the example embodiments of the present disclosure can be carried out without those specifically defined matters. Also, well-known functions or constructions may not be described in detail if they would obscure the disclosure with unnecessary detail.

Prior to a detailed description of the present disclosure, a description of the disclosure and drawings will be provided.

The terms used herein are selected as general terms that are currently widely used in consideration of their functions in the present disclosure. However, these terms may depend on intentions or legal or technical interpretations of those skilled in the art, emergences of new technologies, and the like. Also, there may be some terms arbitrarily selected. These terms may be construed as meanings defined in the present disclosure and may be construed based on whole contents of the present disclosure and common technical knowledge of the art as long as there are no detailed definitions of the terms.

Also, the same reference numerals or symbols described in the attached drawings denote parts or elements that actually perform the same functions. For convenience of descriptions and understanding, the same reference numerals or symbols are used and described in different example embodiments. In other words, although elements having the same reference numerals are all illustrated in a plurality of drawings, the plurality of drawings do not refer to one example embodiment.

Also, the terms "first", "second", etc. may be used to describe diverse components, but the components are not limited by the terms. The terms are simply used to distinguish one component from the others. For example, used orders, arrangement orders, or the like of elements that are combined with these ordinal numbers may not be limited by the numbers. If necessary, the ordinal numbers may be respectively replaced and used.

The singular expression also includes the plural meaning as long as it does not conflict with the context. In the present disclosure, the terms "include" and "comprise" designate the presence of features, numbers, steps, operations, components, elements, or a combination thereof that are written in the disclosure, but do not exclude the presence or possibility of addition of one or more other features, numbers, steps, operations, components, elements, or a combination thereof.

In the various example embodiments of the present disclosure, the term "module", "unit", or "part" may be referred to as an element that performs at least one function or operation, and may be implemented with hardware, software, or a combination of hardware and software. In addition, a plurality of "modules", a plurality of "units", a plurality of "parts" may be integrated into at least one module or chip except for a "module", a "unit", or a "part" which may be implemented with specific hardware, and may be implemented with at least one processor (not shown).

Also, when any part is connected to another part, this includes a direct connection and an indirect connection through another medium. Unless otherwise defined, when any part includes any element, it may refer to a situation in which any part may further include other elements without excluding other elements.

Hereinafter, the present disclosure will be described in greater detail with reference to the attached drawings.

FIG. 1 is a block diagram illustrating an example configuration of a display apparatus 100 according to an example embodiment of the present disclosure.

The display apparatus 100 of the present disclosure may be realized as a TV, various types of monitors capable of receiving a digital broadcast signal, a smartphone, a portable terminal, a mobile terminal, a Personal Digital Assistant (PDA), a Portable Multimedia Player (PMP) terminal, a computer, a notebook computer, a note pad, a Wireless Broadband Internet (WirBro) terminal, a navigation, an MP3 player, a tablet personal computer (PC), a smart TV, and the like. However, it will be apparent to those skilled in the art that the display apparatus 100 according to the present disclosure is not limited to the above-mentioned devices.

Referring to FIG. 1, the display apparatus 100 according to an example embodiment of the present disclosure includes a tuner 110, a display 120, an interface 130, a communicator (e.g., including communication circuitry) 140, and a processor (e.g., including processing circuitry) 150.

The tuner 110 may include various circuitry that receives a broadcast signal transmitted from a broadcasting station through a broadcasting network. The tuner 110 receives a broadcast signal including a plurality of frames by tuning a channel. Here, the broadcast signal may be a standard signal of a digital image compression technique, such as Moving Picture Experts Group (MPEG), H.264, or the like, that is divided into a plurality of Group Of Pictures (GOPs) each including an Intra (I) picture, a Predictive (P) picture, and a Bidirectionally predictive (B) picture.

The I picture refers to a frame that is a criterion to demodulate an image frame constituting a broadcast signal. Interframe motion compensation prediction coding may not be performed with respect to the I picture, but the I picture may be coded by using merely pixels of the frames. The P picture refers to a unidirectional prediction frame, i.e., a picture that may be coded with reference to a previous I picture or P picture. The B picture is a bidirectional prediction frame, and motion compensation prediction coding may be performed with respect to the B picture in back and forth directions with reference to an I or P picture temporally positioned before the B picture or with reference to an I or P picture positioned before or after the B picture.

Among I, P, and B pictures as described above, the B picture has highest compression efficiency, and a GOP including I, P, and B pictures refers to a group that is bound by arranging a plurality of frames in different forms in regular orders.

The display 120 displays the broadcast signal received from the broadcasting station. A realization method of the display 120 is not limited, and thus the display 120 may be realized as various types of displays such as a Liquid Crystal Display (LCD), an Organic Light Emitting Diode (OLED) display, an Active-Matrix Organic Light-Emitting Diode (AM-OLED), a Plasma Display Panel, and the like.

The interface 130 may include various circuitry that senses a user interaction for controlling an overall operation of the display apparatus 100. For example, the interface 130 may receive a channel change command. The channel change command may refer, for example, to a control signal for changing a tuned channel into a channel wanted by the user. Also, the interface 130 may include an input such as a button or the like physically installed in the display apparatus 100 or an infrared signal receiver capable of receiving a channel change command transmitted from a remote controller for controlling the display apparatus 100. In addition, if the display 120 may include a touch sensor capable of sensing a touch input of the user, the display 120 may perform a role of the interface 130 without an additional interface unit.

The communicator 140 may include various communication circuitry that performs communication with an external apparatus according to various types of communication methods. For example, the communicator 140 may receive timing information of a reference frame of a broadcast signal, which is provided through a channel tuned according to a channel change command, from an external apparatus.

The reference frame refers to a frame that is a criterion to demodulate an image frame constituting a broadcast signal of various types of standards such as MPEG H.264, High Efficiency Video Coding (HEVC), and the like. For example, when the broadcast signal is a standard signal of a digital image compression technique of an MPEG 2 standard that is divided into a plurality of GOPs each including I, P, and B pictures, the P and B pictures are generated with reference to the I picture. In terms of this, the I picture corresponds to a reference frame.

If a channel change command into channel A is input through the interface 130, the communicator 140 may receive timing information about when a reference frame of a broadcast signal streamed through the channel A is received, from an external apparatus. Since the display apparatus 100 receives the timing information about when the reference frame is received, from the external apparatus, a seeking operation of the reference frame may be omitted, and a time taken for the seeking operation of the reference frame may be used to continuously display an existing channel. Detailed contents of this will be described with reference to FIGS. 3 and 4.

The external apparatus may be realized as an apparatus capable of transmitting the timing information of the reference frame, another display apparatus, or a server. If the external apparatus is realized as the server, the external apparatus may be a server that provides timing information of reference frames of broadcast signals respectively provided through a plurality of channels. However, the external apparatus may transmit timing information of a reference frame of a broadcast signal provided through a channel that is to be tuned according to a channel change command. In terms of this, the external apparatus may be realized as other display apparatuses that receive the broadcast signal provided through the channel that is to be tuned. For example, if a channel change command received from the display apparatus 100 is a channel change command into the channel A, the external apparatus may be realized as other display apparatuses that receive a broadcast signal provided through the channel A.

The communicator 140 may include various communication circuitry and may be realized, for example, and without limitation, as at least one selected from a wireless Local Area Network (LAN) module and a short-range communication module and may include at least one antenna to communicate with the external apparatus under control of the processor 150. The wireless LAN may be connected to the Internet in a place where a wireless Access Point (AP) is installed, under control of the processor 150. The wireless LAN may support a wireless LAN standard (e.g., Institute of Electrical and Electronics Engineers (IEEE) 802.11x) of IEEE. The short-range communication module may wirelessly perform short-range communication with an external apparatus positioned in a short range under control of the processor 150. A short-range communication method may include wireless fidelity (Wi-Fi), Bluetooth, Infrared Data Association (IrDA), or the like. For this, the communicator 140 may include a Wi-Fi chip, a Bluetooth chip, a wireless communication chip, a Near Field Communication (NFC) chip, and the like.

In particular, if the Wi-Fi chip or the Bluetooth chip is used, the communicator 140 may first transmit and receive various types of connection information, such as a Subsystem Identification (SSID), a session key, and the like, and then may transmit and receive various types of information after performing communication connections by using the various types of connection information. The wireless communication chip refers to a chip that performs communications according to various types of communication standards such as IEEE, Zigbee, $3^{rd}$ Generation (3G), 3rd Generation Partnership Project (3GPP), Long Term Evolution (LTE), and the like. The NFC chip refers to a chip that operates according to an NFC method using a band of 13.56 MHz among various types of radio frequency identification (RF-ID) frequency bands such as 135 kHz, 13.56 MHz, 433 MHz, 860 MHz to 960 MHz, 2.45 GHz, and the like.

The processor 150 may include various processing circuitry configured to control an overall operation of the display apparatus 100. If a channel change command is input, the processor 150 predicts timing for receiving a reference frame through the tuner 110 based on timing information of the reference frame received through the communicator 140 and determines timing for performing channel turning according to the channel change command based on the predicted timing. Therefore, the processor 150 may omit a seeking operation of the reference frame and delay the channel tuning until the determined timing. The processor 150 may use some time taken before performing the channel tuning to display an existing channel tuned before the channel change command is input.

Figure 2:
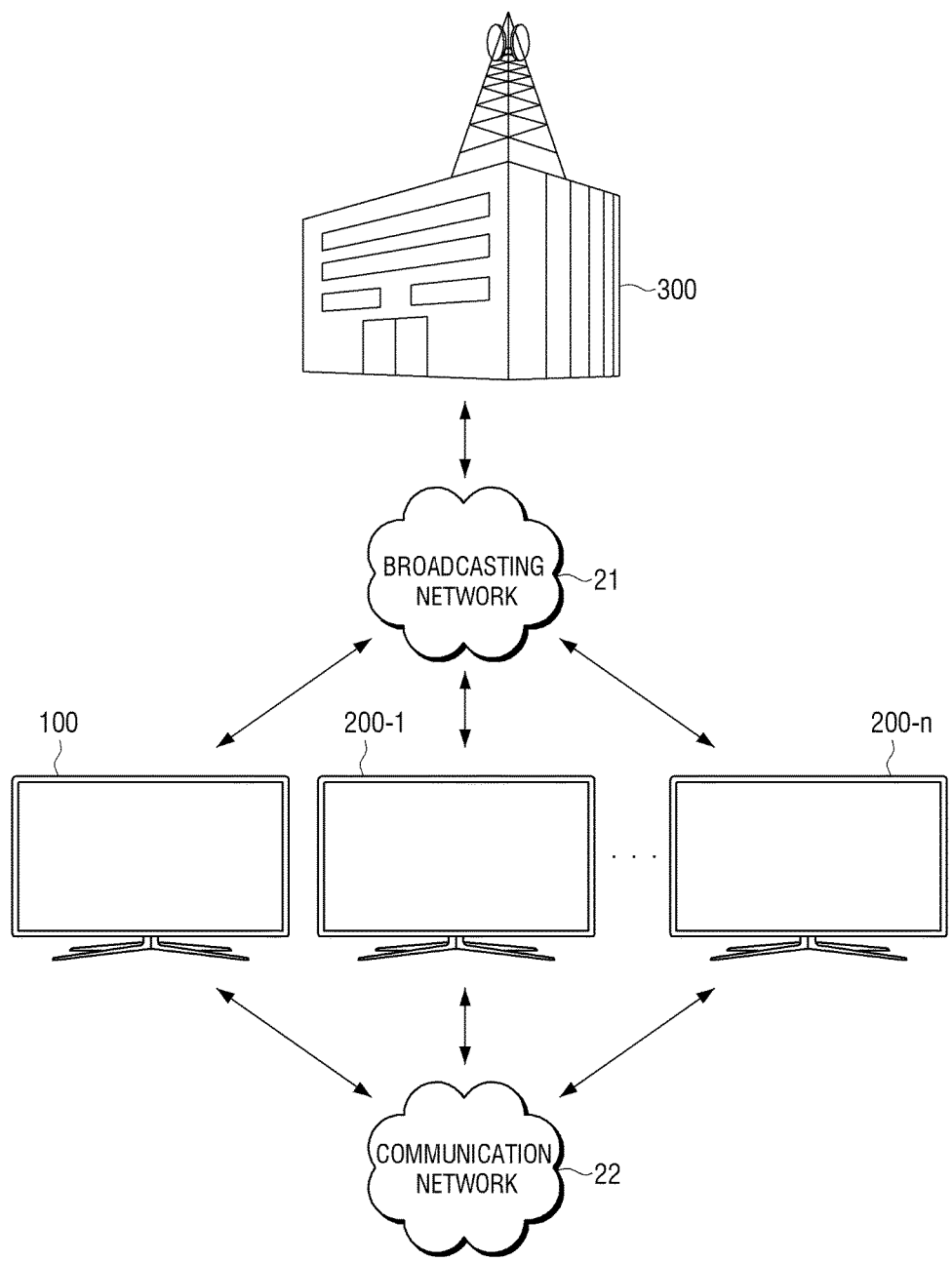
FIG. 2 is a block diagram illustrating an example channel change system including a plurality of display apparatuses, according to an example embodiment of the present disclosure.

FIG. 2 is a block diagram illustrating an example channel change system including a plurality of display apparatus 100, 200-1, . . . , and 200-n according to an example embodiment of the present disclosure.

As illustrated in FIG. 2, the display apparatus 100 of the present disclosure may be connected to at least one or more other display apparatuses 200-1, . . . , and 200-n through a communication network 22. Also, the display apparatus 100 and the at least one or more other display apparatuses 200-1, . . . , and 200-n may receive a broadcast signal from a broadcasting station 300 through a broadcasting network 21.

Here, the at least one or more other display apparatuses 200-1, . . . , and 200-n may include a display apparatus that receives the same channel as a channel tuned according to a channel change command received in the display apparatus 100. In detail, if a channel change command is input, the processor 150 may seek other display apparatuses, which are tuned into the same channel as a channel that is to be tuned according to the channel change command, on the same network. For example, if a channel change command into channel A is input, the processor 150 may seek a display apparatus that is tuned into the channel A among other display apparatuses included on the same network. Here, this seeking process may be performed in a point of time when the channel change command is input or may be periodically performed from before the channel change command is input.

For example, the display apparatus 100 may periodically receive information about a channel, which is tuned into by sought other display apparatuses, from the corresponding display apparatuses by seeking the same network for at least one other display apparatuses through the communicator 140. Thereafter, if a channel change command is input, the processor 150 may receive information about timing for receiving a reference frame from other display apparatuses, which are tuned into the same channel as a channel to which to be changed according to the channel change command, among sought other display apparatuses.

Figure 3:
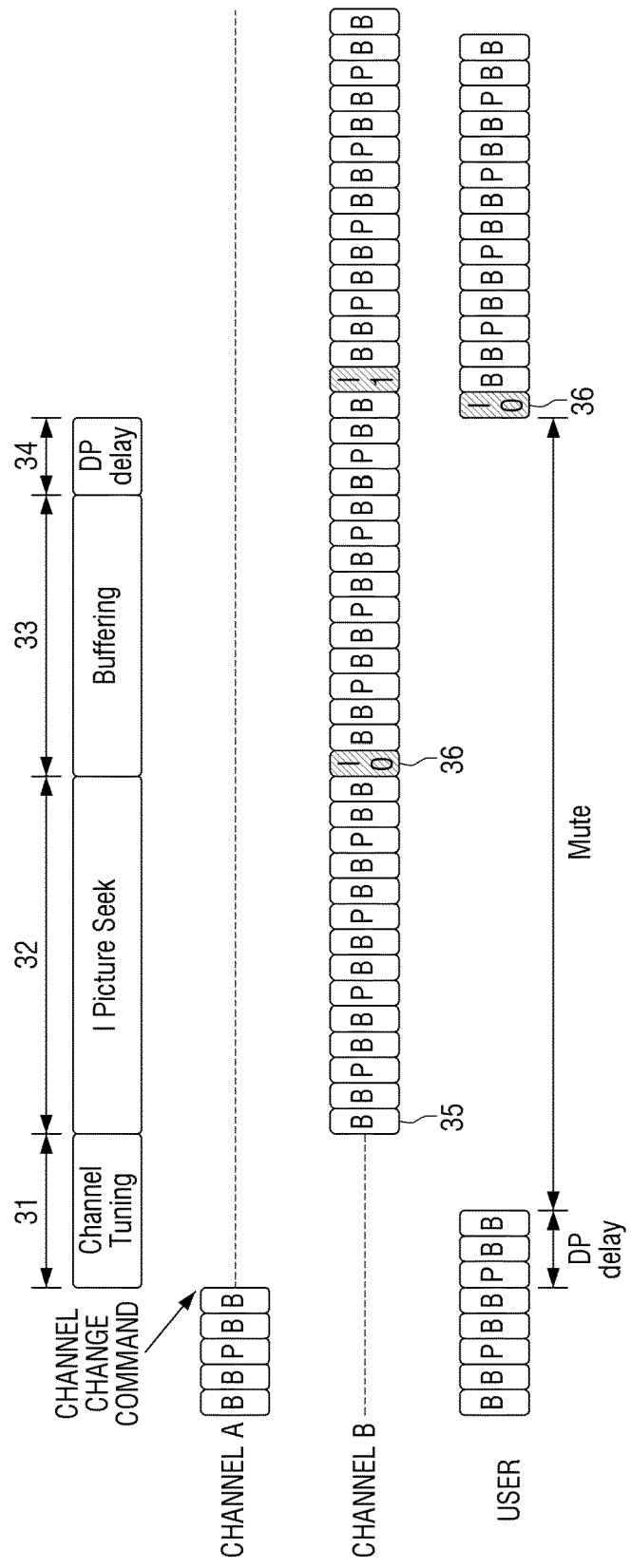
FIG. 3 is a diagram illustrating an example channel change operation according to an existing channel change command.

FIG. 3 is a diagram illustrating a channel change operation according to an existing channel change command. Hereinafter, an example of that an I picture is a reference frame in an MPEG2 standard will be described. However, it is apparent that the reference frame is not limited to the I picture but is understood as including a frame that is a criterion to demodulate an image frame in various types of standards such as H.264, HEVC, and the like.

An existing display apparatus according to FIG. 3 sequentially performs a channel change operation including channel tuning 31, I picture seeking 32, and buffering 33 according to a channel change command. Here, the channel change operation may further require time for DP delay 34.

As illustrated in FIG. 3 channel A, a display apparatus tuned to channel A receives a broadcast signal provided through the channel A. Here, the received broadcast signal includes a plurality of GOPs each including I, P, and B pictures. Here, if the display apparatus receives a channel change command into channel B from a user, the display apparatus ends receiving the broadcast signal provided through the existing channel A and performs the channel tuning 31. If the channel tuning 31 is completed, the display apparatus receives a broadcast signal provided through the channel B. Here, the display apparatus performs the I picture seeking 32 for an I picture among a plurality of frames constituting a broadcast signal. For example, as illustrated FIG. 3 channel B, if a frame received after the channel tuning 31 is completed is B picture 35, the display apparatus enters into a standby state until an I picture 36 included in a next GOP I is received. If the I picture 36 is received, the display apparatus performs the buffering 33, and a broadcast signal is displayed based on the I picture 36 after the time for the DP delay 34 elapses.

As illustrated in FIG. 3 user, the user views a broadcast of the channel B by passing through a mute state where any broadcast signal is not displayed during the channel tuning 31, the I picture seeking 32, the buffering 33, and the time for the DP delay 34, from a moment the user views the existing channel A and then inputs the channel change command into the channel B. Therefore, the user may feel channel change time long.

Figure 4:
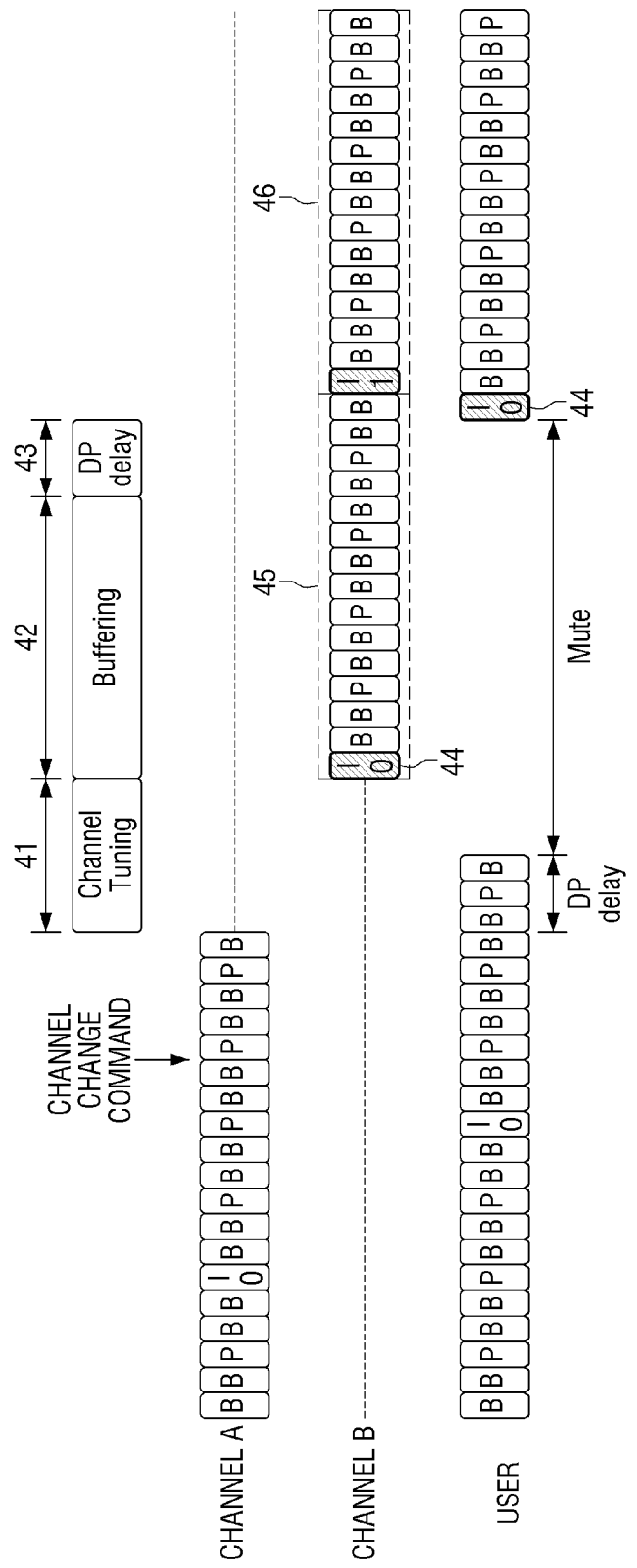
FIG. 4 is a diagram illustrating an example channel change operation from which an operation of seeking a reference frame is removed, according to an example embodiment of the present disclosure.

FIG. 4 is a diagram illustrating an example channel change operation from which an operation of seeking a reference frame is removed, according to an example embodiment of the present disclosure.

The display apparatus 100 according to FIG. 4 sequentially performs a channel change operation including channel tuning 41 and buffering 42 according to a channel change command and does not perform an I picture seeking operation, which is different from an existing display apparatus. Here, the channel change operation may further require time for DP delay 43.

As illustrated in FIG. 4 channel A, the display apparatus 100 tuned into channel A receives a broadcast signal provided through the channel A by the communicator 140. Here, if a channel change command into channel B is received from a user, the display apparatus 100 may predict timing for receiving an I picture through the tuner 110 based on timing information of the I picture included in the broadcast signal received through the communicator 140. In detail, as the channel change command is input, the processor 150 may seek other display apparatuses tuned into the channel B on the same network and request timing information of the I picture from the sought other display apparatuses.

However, according to another example embodiment, the processor 150 may be in a state of seeking other display apparatuses on the same network before the channel change command is input and periodically receiving information about a channel tuned into the other display apparatuses from the sought other display apparatuses. In this state, if the channel change command is input, the processor 150 may request the timing information of the I picture from other display apparatuses tuned into the same channel as a channel to be tuned according to the channel change command.

As illustrated in FIG. 4 channel B, if a channel change command from the channel A into channel B is input, the processor 150 may receive timing information of an I picture 44 included in a next order GOP 45 based on a point of time when the channel change command is input, from a second display apparatus tuned into the channel B. Based on the received timing information, the processor 150 may determine timing for performing the channel tuning 41. The processor 150 may determine the timing for performing the channel tuning 41 so as to complete the channel tuning 41 when the I picture is received and thus the buffering 42 is performed and may perform the channel tuning 41 according to the determined timing.

FIG. 4 user illustrates a frame of a broadcast signal that the user may actually view. Referring to FIG. 4 user, while channel tuning is delayed, the processor 150 may continuously display a broadcast signal provided from a channel tuned when a channel change command is input. Therefore, the user may continuously view an existing channel until the channel tuning is performed. Here, time for viewing the existing channel may increase according to DP delay. Therefore, mute time for an existing channel change operation may be minimized and/or reduced by removing I picture seeking time and increasing time for maintaining an existing channel tuned before the channel change command is input.

Hereinafter, in the description of FIG. 4, for convenience, the display apparatus 100 will be referred to as a first display apparatus, and a sought other display apparatus capable of transmitting the timing information of the I picture will be referred to as a second display apparatus.

The second display apparatus may receive a broadcast signal in the same time zone as the first display apparatus 100 and determine timing for receiving an I picture based on an order of a frame and a size of a GOP that are currently received. Timing of a sought I picture is the same as timing for receiving an I picture of a broadcast signal provided from a channel to be tuned in the first display apparatus 100.

Here, timing information of an I picture received from the second display apparatus through the communicator 140 refers to timing information of an I picture included in at least one GOP that is sequentially received based on a first GOP including a frame received in a point of time when a channel change command is input, e.g., a second GOP 45 or a third GOP 46. The timing information of the I picture may include information about an order of a frame and a size of a GOP that the second display apparatus currently receives through the same channel as a channel to be tuned according to a channel change command.

In detail, as the channel change command is input, the first display apparatus 100 may receive information about an order of a frame and a size of a GOP that the second display apparatus receives in a point of time when a channel change command is input, from the second display apparatus. Here, the first display apparatus 100 may predict when an I picture will be received, based on the information about the order of the frame and the size of the GOP. Time taken for receiving the timing information of the I picture from the second display apparatus 200 after the channel change command is input may be ignored and thus will not be considered hereinafter.

For example, if a frame of a broadcast signal currently received from a broadcasting station is a B picture having a second order of a GOP, and information indicating that the GOP includes 15 frames is received, the processor 150 of the first display apparatus 100 may predict that an I picture included in a next order GOP will be received if 13 frames are further received, based on the received information. Since a time taken for receiving each frame included in a GOP is fixed, the processor 150 may predict timing for receiving an I picture and determine timing for performing channel tuning according to a channel change command based on the predicted timing. For example, if a time taken for receiving one frame is 33 ms, the processor 150 may predict that an I picture will be received if 429 ms (33 ms*13) elapses after a channel change command is input.

Here, information about a size of a GOP may be information that is statistically determined from a broadcast signal provided through a channel to be tuned according to a channel change command.

In detail, based on a broadcast signal provided through the channel B, the second display apparatus may statistically predict a size of a GOP received in a next order by storing a size of a GOP that is most received and transmit the predicted size of the GOP to the first display apparatus 100.

Also, timing information of an I picture may include time information about a point of time when the I picture will be received. Here, the time information about the point of time when the I picture will be received may include time information that is based on standard time or time information that is based on a point of time when a channel change command is input.

The processor 150 may determine timing, where time to timing for predicting receiving of an I picture included in a second GOP sequentially received based on a first GOP including a frame received in a point of time when a channel change command is input corresponds to time taken for pre-stored channel tuning, as timing for performing channel tuning according to the channel change command. Here, the timing corresponding to the time taken for the pre-stored channel tuning refers to timing that becomes equal to a time taken for the pre-stored channel tuning or timing that becomes proximate to a time taken for the pre-stored channel tuning in a preset range.

For example, if time taken for channel tuning is 230 ms, and channel tuning is performed according to a channel change command after the channel change command is input and then 199 ms (between 429 ms and 230 ms) elapses, an I picture may be received immediately after the channel tuning is completed. Therefore, an I picture seeking operation as illustrated in FIG. 3 may be removed, and the processor 150 does not perform channel tuning for 199 ms after the channel change command is input. Therefore, the user may continuously view a channel that the user views, until the channel tuning is performed. Here, even after the channel change command is input, time for which the user may view an existing channel may further include time for DP delay.

If time to timing for receiving an I picture included in a second GOP sequentially received based on a first GOP including a frame received in a point of time when a channel change command is input is shorter than time taken for channel tuning, the processor 150 may determine timing for performing channel tuning according to a channel change command based on timing for receiving an I picture included in a third GOP.

For example, if a frame of a broadcast signal currently received from a broadcasting station is a B picture having a $10^{th}$ order in a GOP, information indicating that the GOP includes 15 frames is received, and 5 frames is further received, the processor 150 of the display apparatus 100 may predict that an I picture included in a next order second GOP will be received. Here, time taken for receiving the I picture included in the second GOP is 165 ms (33 ms*5), and in this case time until the I picture is received is shorter than time 230 ms taken for channel tuning. Therefore, the processor 150 may predict timing for receiving an I picture included in a third GOP having an order following the second GOP and determine timing for performing channel tuning according to a channel change command based on the predicted timing. Here, the timing for receiving the I picture included in the third GOP is a point of time when 660 ms (33 ms*5+33 mm*15) elapses from a point of time when the channel change command is received, and the processor 150 may perform channel tuning in a point of time when 430 ms (between 660 ms and 230 ms) elapses from a point of time when the channel change command is received. Timing information of the I picture included in the third GOP may be predicted by the first display apparatus 100 based on timing information of the I picture included in the second GOP received from the second display apparatus or may be directly received from the second display apparatus.

The display apparatus 100 of the present disclosure may further include a storage 160 that stores information about time taken for channel tuning and may determine timing corresponding to time taken for channel tuning storing time to timing for predicting receiving of an I picture as timing for performing channel tuning based on information stored in the storage 160.

Figure 5:
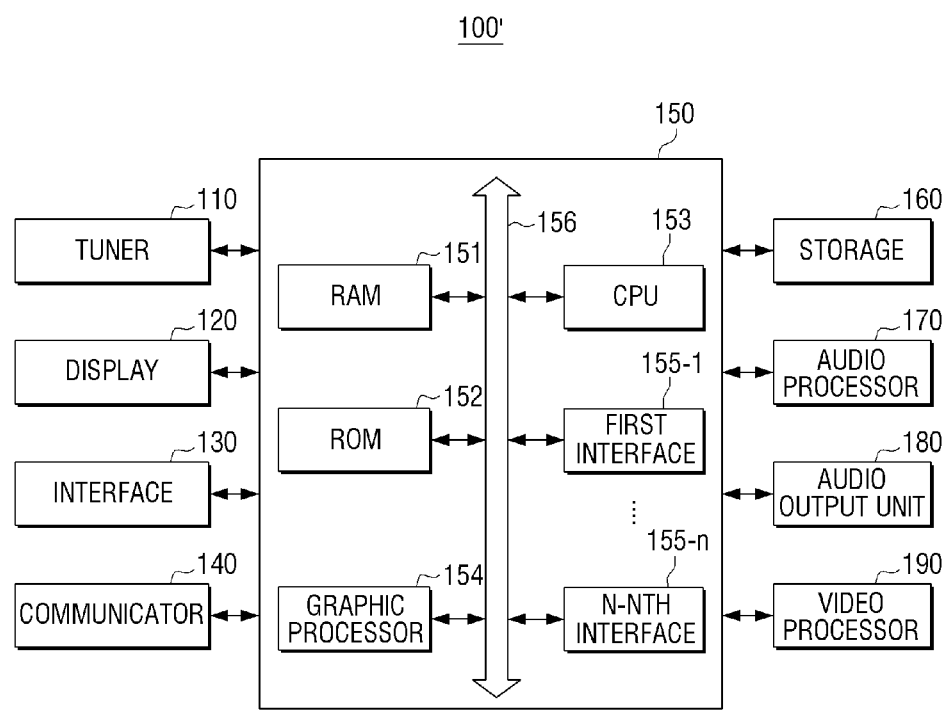
FIG. 5 is a block diagram illustrating an example configuration of a display apparatus, according to another example embodiment of the present disclosure.

FIG. 5 is a block diagram illustrating an example configuration of a display apparatus 100' according to another example embodiment of the present disclosure. As illustrated in FIG. 5, the display apparatus 100' according to the another example embodiment of the present disclosure includes a tuner 110, a display 120, an interface 130, a communicator (e.g., including communication circuitry) 140, a processor (e.g., including processing circuitry) 150, a storage 160, an audio processor 170, an audio output unit 180, and a video processor 190. Hereinafter, descriptions of elements of FIG. 5 overlapping with the descriptions of the elements of FIG. 1 are omitted.

The storage 160 may store various types of modules such as an Operating System (O/S) software module for driving the display apparatus 100' and various types of multimedia contents.

In detail, the storage 160 may store a base module that processes signals respectively transmitted from pieces of hardware included in the display apparatus 100', a storage module that manages a database (DB) or a registry, a security module, a communication module, and the like. In particular, the storage 160 may store information about time taken for channel tuning. The information about the time taken for the channel tuning may be statistical information accumulated according to channel tuning or information stored in a manufacturing process.

The audio processor 170 includes various circuitry that performs processing with respect to audio data.

The audio output unit 180 includes various circuitry that outputs the audio data processed by the audio processor 170.

The video processor 190 includes various circuitry that performs various types of image processing, such as decoding, scaling, noise filtering, frame rate converting, a resolution converting, and the like, with respect to an input image.

The processor 150 may include various processing circuitry configured to control an overall operation of the display apparatus 100' by using various types of modules stored in the storage 160. As illustrated in FIG. 5, the processor 150 may include a random access memory (RAM) 151, a read only memory (ROM) 152, a central processor (CPU) 153, a graphic processor 154, and first through $n^{th}$ interfaces 155-1 through 155-n. Here, the RAM 151, the ROM 152, the CPU 153, the graphic processor 154, the first through $n^{th}$ interfaces 155-1 through 155-n, and the like may be connected to one another through a bus 156.

The CPU 153 performs booting by using the O/S stored in the storage 160 by accessing the storage 160. The CPU 153 may also perform various operations by using various types of programs, contents, data, and the like stored in the storage 160.

The ROM 152 stores a command set and the like for system booting. If power is supplied by inputting a turn-on command, the CPU 153 boots a system by copying the O/S stored in the storage 160 into the RAM 151 and executing the O/S according to a command stored in the RAM 152. If booting is completed, the CPU 153 performs various operations by copying various types of application programs stored in the storage 160 into the RAM 151 and executing the application programs copied into the RAM 151.

The graphic processor 154 generates a screen including various types of objects such as an icon, an image, a text, and the like by using an operator (not shown) and a renderer (not shown). The operator calculates attribute values such as coordinate values at which objects will be respectively displayed according to a layout of the screen, shapes, sizes, and colors of the objects, and the like. The renderer generates a screen having various types of layouts including objects based on the attribute values calculated by the operator.

The first through $n^{th}$ interfaces 155-1 through 155-n are connected to various types of elements as described above. One of interfaces may be a network interface that is connected to an external apparatus through a network.

FIG. 6 is a flowchart illustrating an example method of controlling a display apparatus according to an example embodiment of the present disclosure.

In operation S610, the display apparatus receives a channel change command from a user.

In operation S620, the display apparatus receives, from an external apparatus, timing information of a reference frame of a broadcast signal including a plurality of frames provided through a channel tuned according to the channel change command.

In operation S630, the display apparatus predicts timing for receiving the reference frame based on the received timing information of the reference frame.

In operation S640, the display apparatus determines timing for performing channel tuning according to the channel change command based on the predicted timing and delays the channel tuning until the determined timing.

A method of controlling a display apparatus according to various example embodiments as described above may be embodied as a program and then stored on various types of recording media. In other words, a computer program that may be processed by various types of processors and thus execute various control methods described above may be stored and used on a recording medium.

For example, there may be provided a non-transitory computer readable medium that stores a program including receiving a channel change command, receiving timing information of a reference frame of a broadcast signal including a plurality of frames provided through a channel tuned according to the channel change command, from an external apparatus, predicting timing for receiving the reference frame based on the received timing information of the reference frame, and determining timing for performing channel tuning according to the channel change command based on the predicted timing and delaying the channel tuning until the determined timing.

The non-transitory computer readable medium stores data semi-permanently and is readable by devices. More specifically, the aforementioned applications or programs may be stored in the non-transitory computer readable media such as compact disks (CDs), digital video disks (DVDs), hard disks, Blu-ray disks, universal serial buses (USBs), memory cards, and read-only memory (ROM).

The foregoing example embodiments and advantages are merely examples and are not to be construed as limiting the present disclosure. The present teaching can be readily applied to other types of apparatuses. Also, the description of the example embodiments of the present disclosure is intended to be illustrative, and not to limit the scope of the claims, and many alternatives, modifications, and variations will be apparent to those skilled in the art.

What is claimed is:

1. A display apparatus comprising:
a tuner configured to receive a broadcast signal comprising a plurality of frames by tuning a channel;
a display configured to display the received broadcast signal;
an interface comprising interface circuitry configured to receive a channel change command;
communication circuitry configured to receive, from an external apparatus, timing information about when a past reference frame was received at the external apparatus through the channel associated with the channel change command; and
a processor configured to, in response to the channel change command being received, predict timing for receiving a predicted reference frame through the tuner based on the timing information about when the past reference frame was received at the external apparatus, to determine timing for performing channel tuning according to the channel change command based on the predicted timing, and to delay the channel tuning until the determined timing,
wherein the processor, in response to the channel change command being received, is configured to seek another display apparatus tuned to the same channel as the channel to be tuned according to the channel change command on a same network and to receive the timing information about when the past reference frame was received from the another display apparatus, and wherein the external device comprises the another display apparatus.

2. The display apparatus of claim 1, wherein the broadcast signal comprises a standard signal of a digital image compression technique that is divided into a plurality of Group Of Pictures (GOPs) each group of pictures comprising an Intra (I) picture, a Predictive (P) picture, and a Bidirectionally predictive (B) picture,
wherein the timing information about when the past reference frame was received comprises timing information of an I picture comprised in at least one GOP, wherein the timing information of the I picture is based on a first GOP, wherein the first GOP comprises a frame received in a point of time when the channel change command is received.

3. The display apparatus of claim 1, further comprising:
a storage configured to store information about time taken for the channel tuning,
wherein the processor is configured to determine timing, where a time for predicting timing of receiving of the predicted reference frame corresponds to time taken for the channel tuning stored in the storage, as the timing for performing the channel tuning.

4. The display apparatus of claim 1, wherein the timing information about when the past reference frame was received comprises information about an order of a frame and a size of a GOP.

5. The display apparatus of claim 4, wherein the information about the size of the GOP comprises information that is statistically determined from a broadcast signal provided from the same channel as the channel to be tuned according to the channel change command.

6. The display apparatus of claim 1, wherein the timing information of the predicted reference frame comprises time information about a point of time when receiving of the reference frame is predicted.

7. The display apparatus of claim 1, wherein the processor is configured to cause the display apparatus to continuously display a broadcast signal provided from a tuned channel when the channel change command is received, while the channel tuning is delayed.

8. The display apparatus of claim 1, wherein the processor is configured to seek other display apparatuses on a same network, to periodically receive information about a channel tuned into by the other display apparatuses from the other display apparatuses, and, in response to the channel change command being received, receive the timing information about when the past reference frame was received from at least one of the other display apparatuses tuned into the same channel as the channel to be tuned according to the channel change command.

9. The display apparatus of claim 1, wherein the external apparatus comprises a server configured to provide timing information about when the past reference frame was received for the channel to be tuned to, wherein the channel to be tuned to is one of a plurality of channels.

10. A method of controlling a display apparatus, the method comprising:
   receiving a channel change command;
   receiving, from an external apparatus, timing information about when a past reference frame of a broadcast signal was received at the external apparatus through a channel associated with the channel change command;
   predicting timing for receiving a predicted reference frame based on the timing information about when the past reference frame was received at the external apparatus; and
   determining timing for performing channel tuning according to the channel change command based on the predicted timing and delaying the channel tuning until the determined timing,
   wherein the receiving the timing information about when the past reference frame was received comprises, in response to the channel change command being received, seeking, on a network, another display apparatus tuned to a same channel as a channel to be tuned according the channel change command and receiving the timing information about when the past reference frame was received from the another display apparatus, and wherein the external apparatus includes the another display apparatus.

11. The method of claim 10, wherein the broadcast signal comprises a standard signal of a digital image compression technique that is divided into a plurality of GOPs each GOP comprising an I picture, a P picture, and a B picture,
   wherein the timing information about when the past reference frame was received comprises timing information of an I picture comprised in at least one GOP, wherein the timing information of the I picture is based on a first GOP, wherein the first GOP comprises a frame received in a point of time when the channel change command is received.

12. The method of claim 10, wherein the delaying of the channel tuning comprises determining timing, where time for predicting timing of receiving of the predicted reference frame corresponds to time taken for pre-stored channel tuning, as timing for performing the channel tuning, based on information about time taken for the pre-stored channel tuning.

13. The method of claim 11, wherein the timing information about when the past reference frame was received comprises information about an order of a frame and a size of a GOP.

14. The method of claim 13, wherein the information about the size of the GOP is information is statistically determined from the broadcast signal provided from the same channel as the channel to be tuned according to the channel change command.

15. The method of claim 10, wherein the timing information of the predicted reference frame comprises time information about a point of time when the receiving of the reference frame is predicted.

16. The method of claim 10, wherein the delaying of the channel tuning comprises continuously displaying a broadcast signal provided from a tuned channel when the channel change command is received, while the channel tuning is delayed.

17. The method of claim 10, wherein the receiving of the timing information of the reference frame comprises:
   seeking other display apparatuses on a network and periodically receiving information about a channel tuned into by the other display apparatuses from the other display apparatuses; and
   in response to the channel change command being received, receiving the timing information about when the past reference frame was received from another display apparatus tuned into a same channel as a channel to be tuned according to the channel change command.

18. The method of claim 10, wherein the external apparatus comprises a server configured to provide timing information about when the past reference frame was received for the channel to be tuned to, wherein the channel to be tuned to is one of a plurality of channels.

* * * * *